April 5, 1966   R. A. VELEY ETAL   3,244,452
AUTOMOBILE SEAT BELT GUARD
Filed May 23, 1962

INVENTORS
RONALD A. VELEY
IRENE P. VELEY
BY Cushman, Darby & Cushman
ATTORNEYS

United States Patent Office 3,244,452
Patented Apr. 5, 1966

3,244,452
AUTOMOBILE SEAT BELT GUARD
Ronald A. Veley and Irene P. Veley, both of
713 3rd Ave., Williamsport, Pa.
Filed May 23, 1962, Ser. No. 197,057
1 Claim. (Cl. 297—385)

The present invention relates to a seat belt guard and more particularly to a guard for keeping the safety belt near the side edge of a vehicle seat from falling to the vehicle floor when the belt is not in use.

As the speed of travel of passenger vehicles has increased the need for safety belts to retain the passengers in their seats in the event of collision or fast stops has also increased. However, the acceptance of belts by the purchasers of vehicles has not been commensurate with the increase in need. A prime reason for this disparity is the poor impression that seat belts, as disclosed by the prior art, have had on prospective purchasers of safety belt equipped passenger vehicles when the prospective purchasers "test drive" the vehicles. To illustrate, a prospective purchaser gets behind the wheel of an automobile equipped with vehicle floor anchored safety belts and closes the door. He takes the safety belt on his right in his right hand and gropes for the safety belt on his left so he can engage its tongue with the clasp of the belt on his right to secure himself in his seat, but the safety belt on his left is caught between the door sill and automobile door because it had fallen unnoticed from the edge of the seat as the prospective purchaser entered the vehicle. The prospective purchaser opens the vehicle door, frees the safety belt, shuts the door and engages the safety belts. Alternatively, the protective purchaser in engaging the safety belt notices that the belt nearest the edge of the seat is grimy and dusty from having fallen from the seat and dragged on the vehicle floor so many times and will soil his clothes if he uses it. In either alternative the prospective buyer most probably concludes that safety belts are more bother than help and decides against incorporating them in the vehicle he purchases and the cause of safety suffers a defeat. Even when seat belts as disclosed by the prior art are provided on vehicle seats, passengers often do not use them because the free ends of the belts nearer the edges of the vehicle seats have fallen out of sight and easy reach and therefore out of mind.

It is therefore an object of the present invention to provide a passenger vehicle safety belt system including a safety belt guard that will restrain the free end of a passenger safety belt from falling off the passenger seat when the belt is not in use, but will not interfere with the operation of the safety belt when the belt is in use.

A further object of this invention is to provide a safety belt guard that will retain the free end of passenger vehicle safety belt within sight and easy reach when the belt is not in use.

Yet another object of the present invention is to provide a guard for a passenger vehicle safety belt that does not interfere with the use of the safety belt but will prevent the free end of the safety belt from falling to the vehicle floor or being caught in the vehicle door when the belt is not in use.

These and other objects of our invention will become more apparent during the course of the following detailed description and appended claims.

This invention may best be understood with reference to the accompanying drawing in which.

Figure 3:
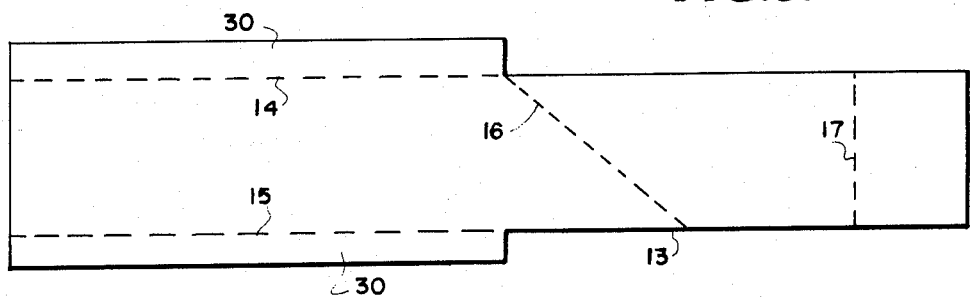
FIGURE 3 is a plan view of one embodiment of the safety belt guard of our invention before it has been folded into the position of use.
Figure 4:
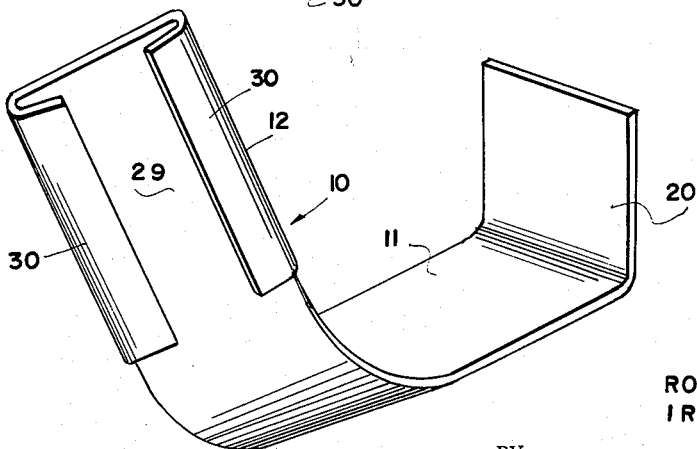
FIGURE 4 is a perspective view of the guard shown in FIGURE 3 after it has been folded into the position of use.

Referring now more particularly to the drawing the present invention comprises a passenger vehicle seat safety belt guard generally indicated at 10, said guard having a shank portion 11 and a safety belt slidably engaging portion 12. In a preferred embodiment of our invention the guard 10 is formed from a flat blank 13 of material that is easily flexed but holds its shape in the flexed position. An example of a preferred material is vinyl coated sheet metal. The blank 13 is folded along the lines 14, 15, 16 and 17 shown dotted in FIGURE 3 to form the safety belt guard as shown in FIGURE 4. Alternately the guard can be molded from a flexible plastic such as polyethylene.

Figure 2:
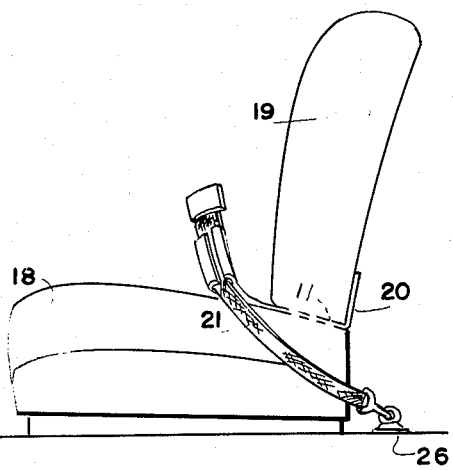
FIGURE 2 is a side elevation of the system shown in FIGURE 1.

In installing a safety belt guard of our invention as best shown in FIGURE 2, the shank portion 11 of the guard is inserted between the seat cushion portion 18 and back cushion portion 19 of the passenger seat. The upturned portion 20 of the shank 11 is secured to the vehicle passenger seat by riveting, heat sealing, stapling or other suitable means. In this position of the guard the belt engaging portion 12, by virtue of the oblique fold line 16, is angled generally toward the lap of the user.

Figure 1:
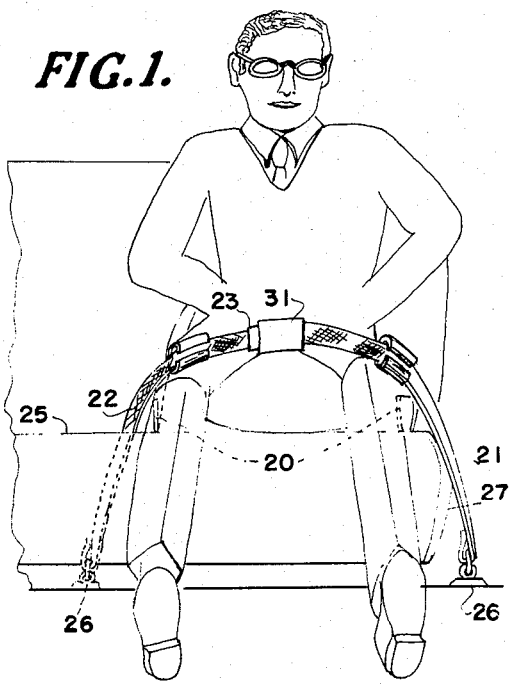
FIGURE 1 is a front elevation of a safety belt system incorporating the seat belt guard of our invention showing the system in use.

Conventional safety belts 21 and 22 shown in FIGURES 1 and 2 extend between the passenger seat cushion portion and the passenger back cushion portion along the line of abutment 25 thereof and are attached to anchors 26 which are secured to the vehicle passenger compartment floor behind the passenger seats. Alternatively, the safety belt 21 which is nearer the side edge 27 of the seat cushion portion may be mounted so that it extends from the anchor and around the side of the passenger seat. Also, the shank portions 11 of the safety belt guards may pass between the back cushion 19 and seat cushion 18 and be secured to the anchors 26 of their associated safety belts, instead of being secured to the passenger seat.

The safety belt guards are brought into operating relationship with the safety belts 21 and 22 after each has been mounted by flexing each safety belt transversely and inserting it in the channel formed in each guard by the body portion 29 and the tabs 30 which extend upwardly from the body portion 29 and inwardly toward each other. The dimensions of the channels are such that the safety belts can slide longitudinally in the channels but cannot slide out of the channels because of the size of the buckle 31 which is fastened to the end of the safety belt 21 which is located nearer the center of the passenger seat and the tongue or tab such as the tongue 23 which is fastened to the end of the safety belt 22 that is located nearer the side edge 27 of the passenger seat.

Because the shank portion 11 of each guard is shorter than the safety belt associated with it and each safety belt is slidably secured within the channel of each guard in a position intermediate the anchored and connector containing ends of each safety belt, the free end of each belt is positioned on the seat cushion portion and is restrained from falling to the vehicle floor being caught in a vehicle door when the belt is not in use.

In using a safety belt system having the guards of our invention incorporated therewith as shown in FIGURE 1 a passenger sits on the seat cushion portion of the passenger seat intermediate two seat belts. He grasps the free end of a safety belt in each hand, said free ends being easily located because they are held within the sight and easy reach by the safety belt guards and pulls the free ends, having connectors associated therewith, toward each other through the slidably engaging portions of the guards and fastens the two connectors to each other so that the safety belts pass over the passenger's lap unhindered by the safety belt guards and retain the passenger in the passenger seat.

When the passenger wishes to remove his safety belts, he unfastens the connectors and slides each safety belt a short distance longitudinally through each safety belt guard. The belts are now positioned by the guards on the seat where they cannot fall to the floor or catch in a door and where they will be within sight and easy reach of the next passenger who wishes to use them.

Although a safety belt system has been shown having safety belt guards associated with each safety belt it may be desirable, to save expense by using the guards of our invention only with the safety belts that are mounted near enough to the side edges of the seats that they could fall to the vehicle floor or get caught in a vehicle door if guards were not used.

The shape of the safety belt guard may be changed considerably from that shown and the point, angle and method of securement may be varied, such as heat sealing the guard to a plastic seat cover, without changing the functional effectiveness of the safety belt guard of our invention.

The safety belt guard of our invention is effective in use not only with the specific type of safety belts shown for illustration, but with any passenger vehicle seat safety belts to restrain the same from falling to the vehicle floor, being caught in a vehicle door or being forgotten because they are out of sight.

While we have set forth a specific embodiment for the purpose of illustrating the principles of our invention it should be understood that many changes may be made in the specific embodiment without departing from the principles thereof. Therefore, this invention includes all of the modifications encompassed within the spirit and scope of the following claims.

What is claimed is:

A vehicle seat safety belt guard comprising: an elongated flexible shank obliquely doubled over upon itself intermediate its ends; means secured to one end of said shank defining a channel for receiving a vehicle seat safety belt for longitudinal slidable movement therein; and means on the other end of said shank for attaching the same adjacent a vehicle seat, the arrangement being such that the guard when so attached directs the belt received therein away from the seat edge and positions the belt for easy accessibility.

References Cited by the Examiner

UNITED STATES PATENTS

| | | | |
|---|---|---|---|
| 2,665,143 | 1/1954 | Rasmussen | 297—385 |
| 2,848,250 | 8/1958 | Sheren | 297—385 |
| 3,076,679 | 2/1963 | Lorber | 297—385 |

FRANK B. SHERRY, *Primary Examiner.*

J. S. PETRIE, *Assistant Examiner.*